US005214959A

United States Patent [19]

Moriguchi et al.

[11] Patent Number: 5,214,959

[45] Date of Patent: Jun. 1, 1993

[54] IDLE POSITION DETECTION SWITCH FOR ENGINES

[75] Inventors: Teruhiko Moriguchi; Yutaka Okaue; Osamu Matsumoto, all of Hyogo, Japan

[73] Assignee: Mitsubishi Denki K.K., Tokyo, Japan

[21] Appl. No.: 720,049

[22] Filed: Jun. 24, 1991

[30] Foreign Application Priority Data

Jul. 2, 1990 [JP] Japan ................................ 2-177026

[51] Int. Cl.[5] ........................................... G01M 15/00

[52] U.S. Cl. ........................................ 73/118.1; 439/606

[58] Field of Search ................ 73/118.1; 439/604, 606

[56] References Cited

U.S. PATENT DOCUMENTS 4,411,154 10/1983 Kitamura et al. .................. 73/118.1

4,815,317 3/1989 Matsumoto et al. ............... 73/118.1

*Primary Examiner*—Jerry W. Myracle

*Attorney, Agent, or Firm*—Sughrue, Mion, Zinn, Macpeak & Seas

[57] ABSTRACT

An idle position detection switch, in which a fixed contact, a terminal for transmitting an idle position signal to an external terminal, and a support disc firmly attaching both the fixed contact and the terminal are insert-molded into a connector made of a resin. As a result of the construction, not only the switch can be fabricated with less components and less cost, but also each contact portion has such an improved rigidity as to allow the incidence of false contacts to be reduced.

3 Claims, 4 Drawing Sheets

IDLE POSITION DETECTION SWITCH FOR ENGINES

BACKGROUND OF THE INVENTION

The invention relates to an idle position detection switch for internal combustion engines.

To control the amount of fuel supply in accordance with the opening of a throttle valve in internal combustion engines, an idle position detection switch is conventionally used. FIG. 5 shows an exemplary conventional idle position detection switch of the above type. In FIG. 5, within a substantially cylindrical housing 2 mounted on a throttle body 1 are a push rod 3, a movable contact 4 arranged at the lower end portion of the push rod 3, and a fixed contact 5 arranged so as to confront the movable contact 4. The throttle body 1 is mounted on an engine (not shown) and grounded. The push rod 3 is supported while inserted into a substantially cylindrical guide 6 so as to be inwardly slidable, the guide being disposed inside the housing 2. The upper end portion of the push rod 3 projects from an end opening of the housing 2.

A ring-like plate 7 is fitted with the inner periphery of a lower end portion of the guide 6 for the push rod 3. Inside a lower end opening of the housing 2 is an insulator 8, which is disposed at the inner periphery of the housing 2. Reference character 6a designates a resilient strip unitized with a large diameter portion 6b of the guide 6; 6c, a snap fit pawl disposed at the lower end of the resilient strip 6a; 8b, a snap fit hole, disposed on the insulator 8, for receiving the snap fit pawl 6c; 8c, a locking portion so that the snap fit pawl 6c will not fall off; 9, a fixed ring disposed at the lower end of the push rod 3; 10, a support disk which carries the fixed contact 5; 11, a terminal strip which comes in electrical contact with the fixed contact 5 supported by the support disk 10; 12a, a terminal of a lead 12 caulked by the terminal strip 11; 16, a terminal caulked by the lead 12; and 17, a connector supporting the terminal 16.

Reference numeral 13 designates a spring, and the upper portion 13a of the spring 13 extends radially inwardly to be firmly seated at a lower end of the push rod 3, so that the upper portion 13a of the spring 13 can be held while clamped between the lower end of the push rod 3 and the plate 7. Accordingly, the upper end of the spring 13 is electrically connected to the movable contact 4. The lower end portion of the spring 13 extends radially outwardly to form a large coiled portion 13b. The large coiled portion 13b is positioned at a guide groove 8d arranged at an outer peripheral portion of the insulator 8 and is so attached as to be clamped onto a stepped portion 2a of the housing 2. Accordingly, the lower end of the spring 13 is electrically connected to the housing 2. The clamping of the large coiled portion 13b onto the stepped portion 2a takes place simultaneously with firmly attaching a case 18 to the housing 2 by caulking a portion 2b. The radially and outwardly extending portion at the lower end of the spring 13 is coupled to the large coiled portion 13b by projecting out while passing through a recess formed in the insulator 8. As aforesaid, the insulator 8 has the guide groove 8d at its outer peripheral portion. In addition, the insulator 8 has a support column 8c at a position radially confronting the recess. The large diameter portion 6b of the guide 6 confronts the insulator 8 so as to come in contact therewith and encloses the spring 13, the movable contact 4, and the like therein. The large diameter portion 6b has a notched groove 6d for receiving the support column 8c of the insulator 8. Between the housing 2 and the large diameter portion 6b of the guide 6 is a wave washer 14. Reference numeral 15 designates a cover made of rubber for enclosing the case 18. On the other hand, the outer periphery of the upper end of the housing 2 is a screw portion 2c formed, so that the screw portion 2 can be screwed into a screw hole 1a arranged on the throttle body 1.

The operation of the idle position detection switch will be described next. As a valve shaft 19 of a not shown throttle valve is rotated in response to a complete closure of the throttle valve, an escalating end portion 20a of a stopper 20 causes the push rod 3 to be biased while resisting the resilient force of the spring 13, thereby bringing the movable contact 4 disposed at the lower end portion of the push rod 3 into contact with the fixed contact 5. It is at this stage that the stopper 20 is positioned. The idle position detecting current is grounded while sequentially flowing through the terminal 16, the lead 12, the terminal strip 11, the fixed contact 5, the movable contact 4, the plate 7, the spring 13, the housing 2, and the throttle body 1. As a result, the idle position can be detected.

Since the conventional idle position detection switch is constructed as described above, the current path, which includes the terminal 16, the lead 12, the terminal strip 11, the fixed contact 5, the movable contact 4, the plate 7, the spring 13, the housing 2, and the throttle body 1, is complicated. As a result, the contact resistance tends to increase, and it is likely that the load applied to the fixed contact 5 will deform or break the support disc 10.

In addition, the components involved in the above construction being large in number elevates the manufacturing cost of the switch, while the length of the lead wire contributes to impairing its applicability as a general-purpose device.

The invention has been made in view of the above circumstances. Accordingly, an object of the invention is to provide an idle position detection switch for engines, which can be constructed with less components and attempts to not only reduce the incidence of defective contacts and its manufacturing cost, but also improve its strength and applicability.

SUMMARY OF THE INVENTION

To achieve the above object, the invention is applied to an idle position detection switch for engines, which include: a metallic housing which is secured to a throttle body and electrically connected to the throttle body; a push rod which is attached to the housing so as to be slidable in the axial direction; one end of the push rod projecting from the housing so as to be abutted against a stopper disposed on a valve shaft of a throttle valve; a movable contact which is arranged at the other end of the push rod; a fixed contact which confronts the movable contact and is secured to the housing while interposing a resin insulator therebetween; a resin guide which guides the push rod; a metallic spring which biases the push rod to cause it to return to its original position. The spring serves to ground the movable contact to the housing, and an end of the spring is firmly attached to the movable contact, while the other end is firmly attached to the housing. The stopper of the throttle valve is abutted against the push rod to bias the push rod. As a result, both contacts are brought into contact with each other to produce an idle position signal. In such an idle position detection switch, the fixed contact, a terminal for transmitting the idle position signal to an external terminal, and a support disc firmly attaching both the fixed contact and the terminal are insert-molded into a connector made of a resin.

In the invention, the fixed contact, the support disc, and the terminal are insert-molded into the resin-made connector so that all these components are integrated into one unit. As a result, not only the number of components can be significantly reduced, but also the strength of the contact portions can be improved.

DETAILED DESCRIPTION OF THE PREFERRED EMBODIMENT

Figure 1:
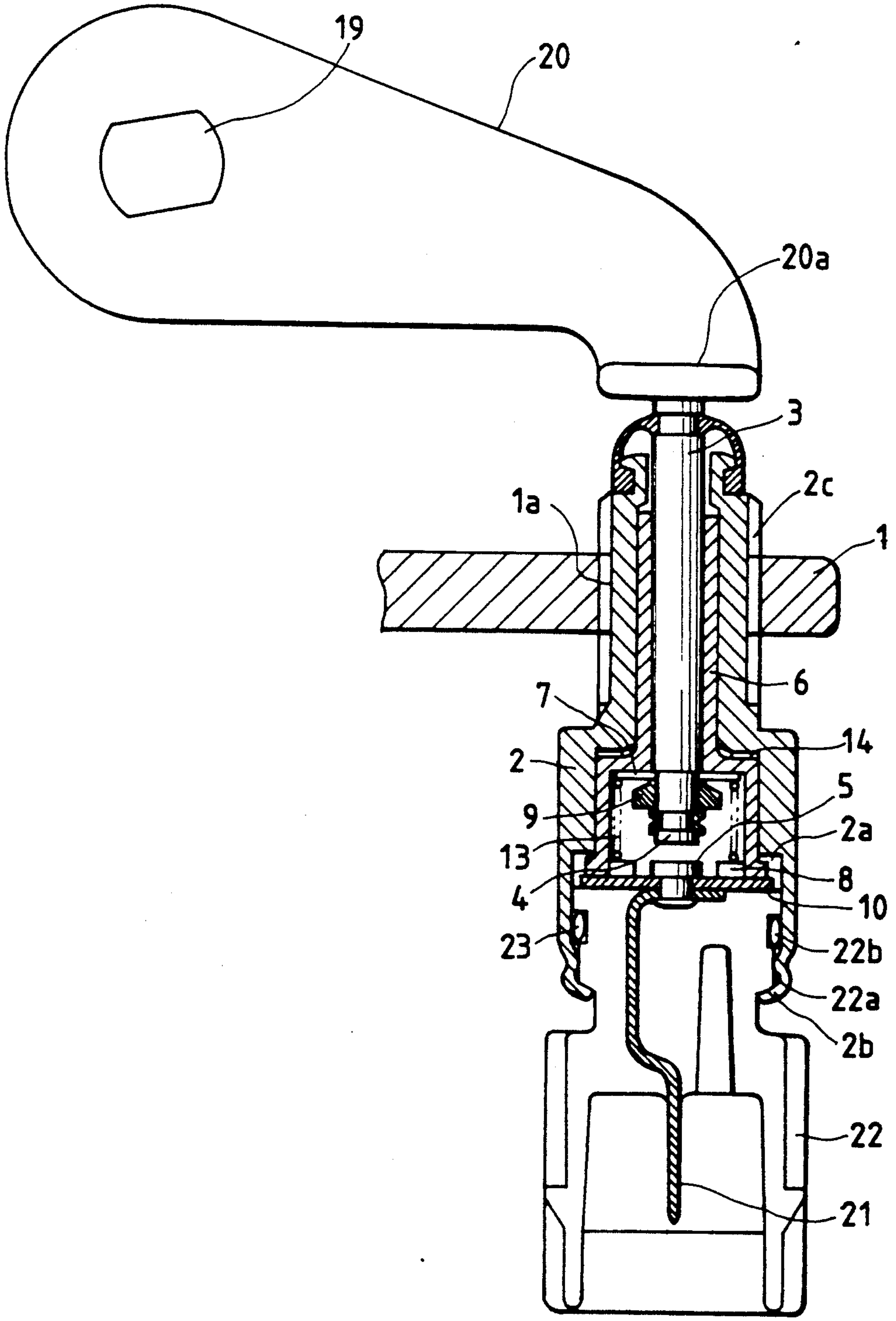
FIG. 1 is a diagram showing the construction of an idle position detection switch for engines, which is an embodiment of the invention.
Figure 5:
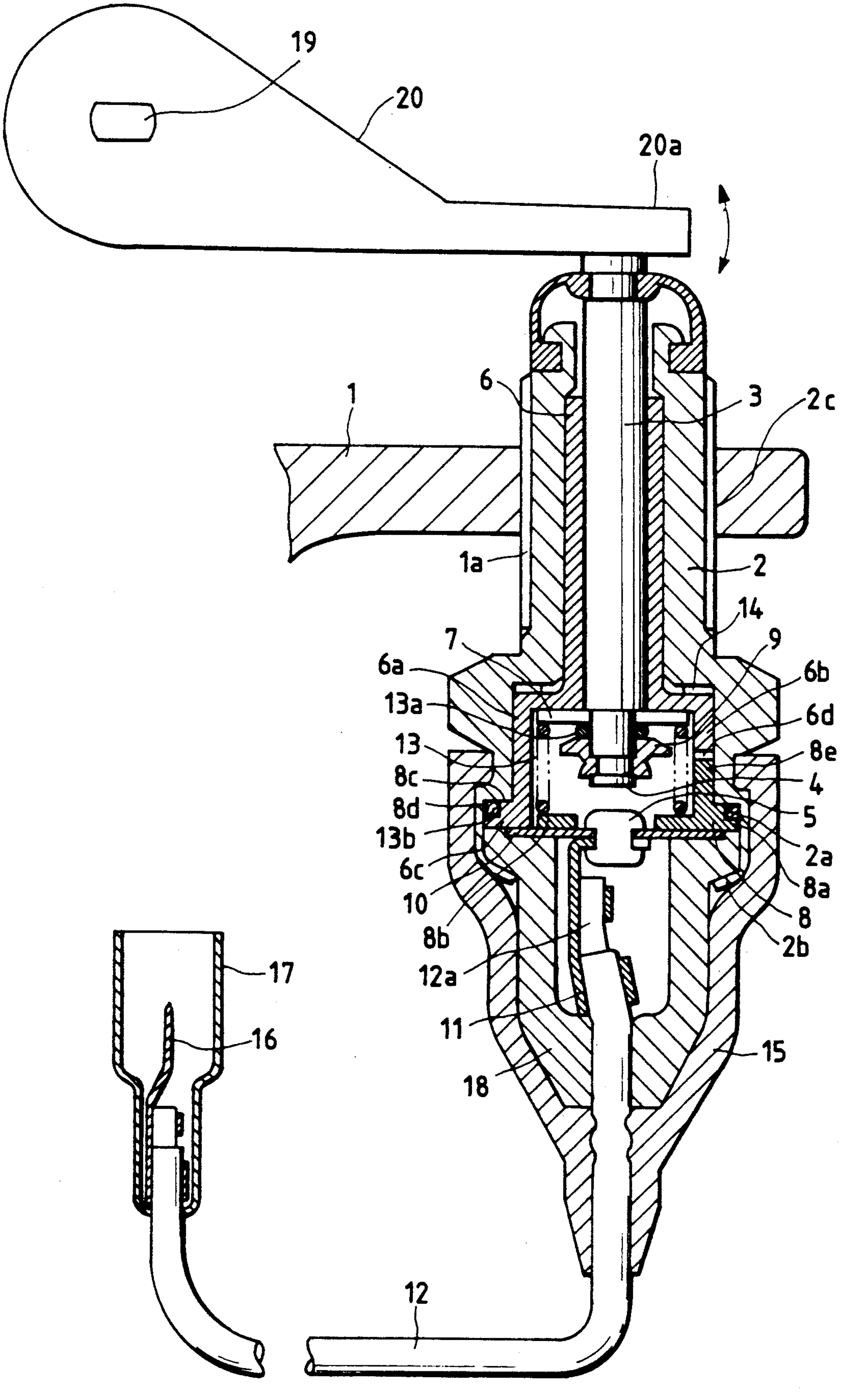
FIG. 5 is a diagram showing the construction of a conventional idle position detection switch.

An embodiment of the invention will be described with the accompanying drawings. FIG. 1 is a diagram showing the construction of an idle position detection switch for engines of the invention. In FIG. 1, the same parts and components as the device described with respect to FIG. 5 are designated by the same reference numerals and characters, and their description will be omitted. In FIG. 1, a connector 22 made of a resin is integrally formed by insert-molding a fixed contact 5, a support disc 10, and a terminal 21. An outer peripheral portion 22*a* of the connector 22 is secured to a housing 2 while caulked by a portion 2*b*, and the gap between the connector 22 and the housing 2 is sealed with an O ring 23 attached to a groove portion 22*b* that is formed on the connector 22.

The idle position detection switch according to the invention operates as follows. Upon rotation of a valve shaft 19 of a throttle valve in response to a complete closure of the throttle valve, an oscillating end portion 20*a* of a stopper 20 causes a push rod 3 to be biased while withstanding the resilient force of a spring 13, bringing a movable contact 4 disposed at the lower end of the push rod 3 into contact with a fixed contact 5. It is at this stage that the stopper 20 is positioned. The idle position detecting current is grounded sequentially through a terminal 21, the fixed contact 5, the movable contact 4, a plate 7, the spring 13, the housing 2, and the throttle body 1, thereby causing an idle position to be detected.

Figure 2:
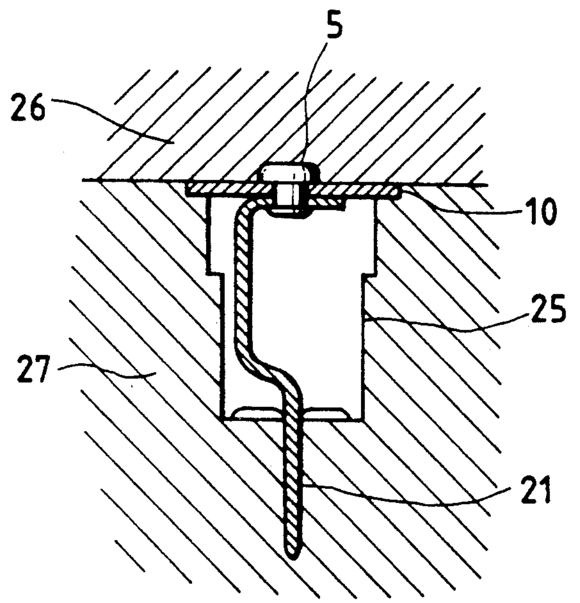
FIGS. 2 and 3 are diagrams illustrating another connector forming process.
Figure 3:
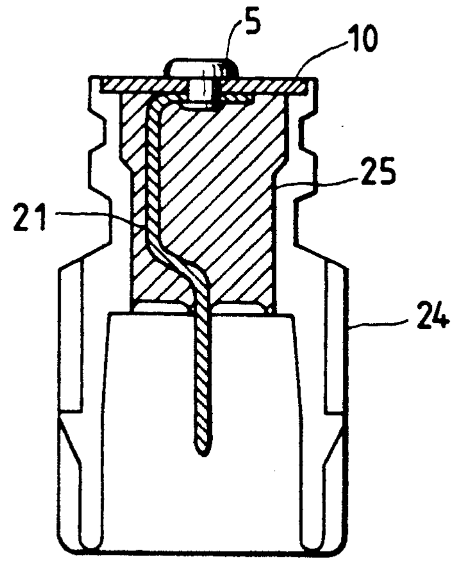
Figure 4:
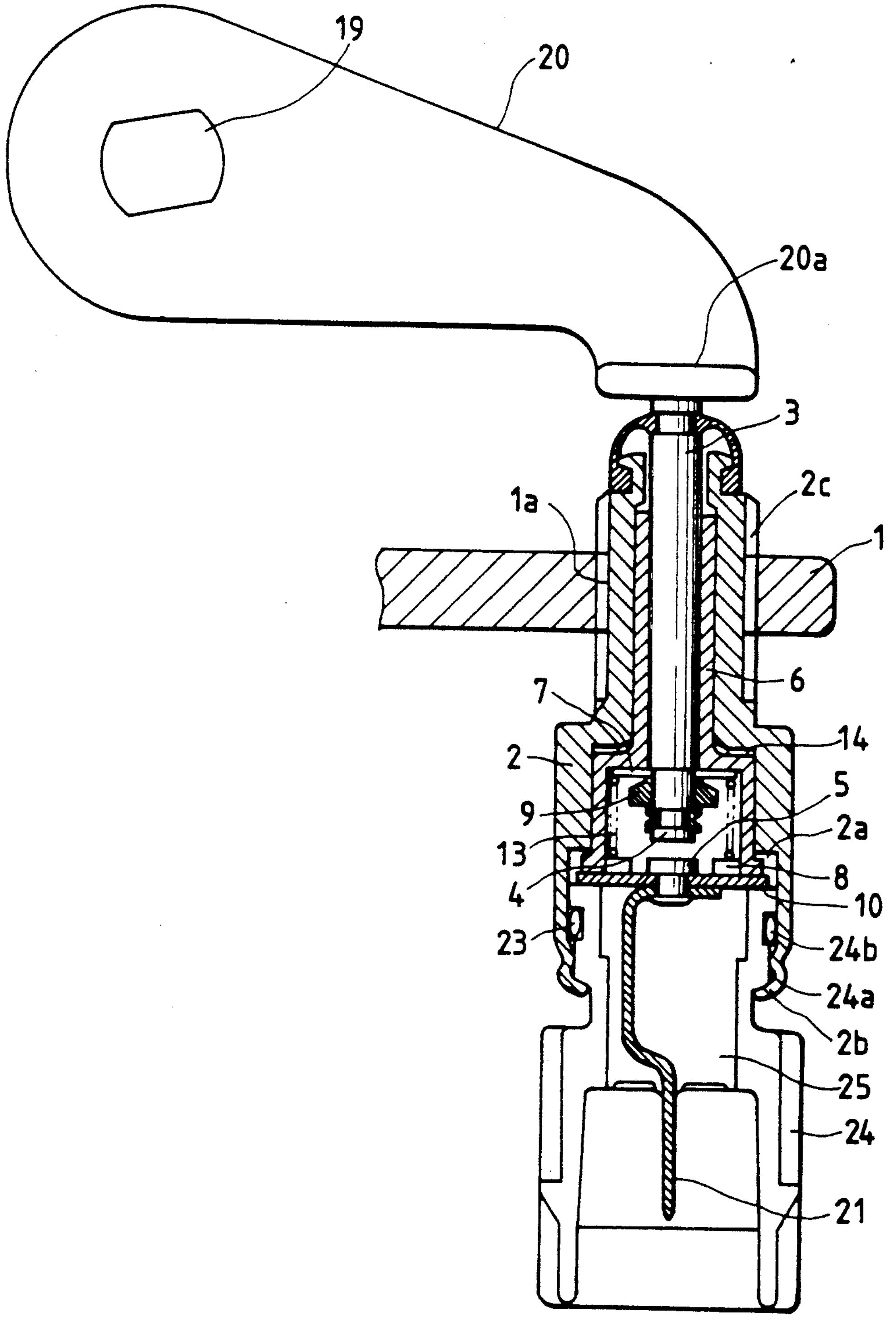
FIG. 4 is a diagram showing the construction of an idle position detection switch using a connector formed by the process shown in FIGS. 2 and 3.

While the connector 22 which is formed by insert-molding the fixed contact 5, the support disc 10, and the terminal 21 with a single process step is described in the above embodiment, the insert-molding process may take two steps as shown in FIGS. 2 and 3. This is to overcome the problem associated with the single-step process; i.e., it is difficult to position the fixed contact 5 and the support disc 10. FIG. 2 shows a first step of the insert-molding process. The support disc 10 caulked by the fixed contact 5 and the terminal 21 is clamped between primary molds 26 and 27, so that these components can be positioned accurately. Then, the terminal 21 and the connector 25 whose rigidity has been improved by the primary molding are supported. As a result, a molded product in which the fixed contact 5 and the support disc 10 have been positioned with high accuracy can be produced during secondary molding shown in FIG. 3. FIG. 4 shows an idle position detection switch having a connector fabricated by the aforesaid molding process.

As described in the foregoing, according to the invention, the fixed contact, the support disc, and the terminal are insert-molded into a resin connector. As a result, the terminal strip, the lead, the case, and the rubber cover can be dispensed with, thereby allowing the incidence of defective contacts to be reduced, which further contributes to reducing the manufacturing cost. In addition, impact loads applied to the fixed contact and the support disc generated by the switching operation can be distributed over the entire part of the connector, thereby allowing the strength of each contact portion to be improved.

What is claimed is:

1. An idle position detection switch for an engine, comprising:

- a metallic housing secured and electrically connected to a throttle body;
- a push rod having first and second ends and being slidably supported by said housing to be slidable in an axial direction thereof, said first end of said push rod projecting from said housing and abutting a stopper disposed on a valve shaft of a throttle valve;
- a movable contact disposed on said second end of said push rod;
- a fixed contact confronting said movable contact and being secured to said housing;
- a resin guide for guiding said push rod;
- an insulator made of resin for insulating said fixed contact from said housing;
- a metallic spring for biasing said insulator and said push rod to cause said push rod to return to an original position thereof, said spring having first and second ends and grounding said movable contact to said housing, said first end of said spring being firmly attached to said movable contact, and said second end of said spring being firmly attached to said housing, said stopper of said throttle valve abutting said push rod to bias said push rod, whereby said movable and fixed contacts are brought into contact with each other to generate an idle position signal;
- a terminal for transmitting said idle position signal to an external terminal;
- a support for firmly attaching said fixed contact to said terminal; and
- a connector comprising a resin integrally formed with said fixed contact, said terminal and said support being disposed in said connector.

2. A switch as claimed in claim 1, wherein said connector includes an outer peripheral portion secured to a first portion of said housing by caulking, said housing being sealed with a ring attached to said first portion of said housing secured to said connector, wherein said connector comprises a structure made in a single molding step.

3. A switch as claimed in claim 1, wherein said connector includes an outer peripheral portion secured to a first portion of said housing by caulking, said housing being sealed with a ring attached to said first portion of said housing secured to said connector, wherein said connector comprises a structure made in two molding steps.

* * * * *